United States Patent
Vikberg et al.

(10) Patent No.: US 8,452,283 B2
(45) Date of Patent: May 28, 2013

(54) FEMTOCELL BASE STATION AND METHOD THEREOF

(75) Inventors: Jari Vikberg, Järna (SE); Karl-Peter Ranke, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/264,109

(22) PCT Filed: Sep. 9, 2011

(86) PCT No.: PCT/SE2011/051100
§ 371 (c)(1),
(2), (4) Date: Oct. 12, 2011

(65) Prior Publication Data
US 2013/0045733 A1 Feb. 21, 2013

Related U.S. Application Data

(60) Provisional application No. 61/523,703, filed on Aug. 15, 2011.

(51) Int. Cl.
H04W 4/00 (2009.01)
(52) U.S. Cl.
USPC .......... 455/435.1; 455/422.1; 455/432.1; 455/432.3; 455/435.2; 370/252; 370/328; 370/329; 370/330; 370/338
(58) Field of Classification Search
USPC .......... 455/422.1, 432.1, 432.3, 435.1, 435.2; 370/252, 328–330, 338
See application file for complete search history.

(56) References Cited

U.S. PATENT DOCUMENTS

| | | | | |
|---|---|---|---|---|
| 6,721,560 | B1 * | 4/2004 | Laiho | 455/432.1 |
| 7,941,144 | B2 * | 5/2011 | Nylander et al. | 455/435.1 |
| 2007/0171857 | A1 * | 7/2007 | Wang et al. | 370/328 |
| 2009/0172397 | A1 * | 7/2009 | Kim | 713/168 |

FOREIGN PATENT DOCUMENTS

| | | |
|---|---|---|
| EP | 2160049 A1 | 3/2010 |
| WO | 2008037804 A1 | 4/2008 |

OTHER PUBLICATIONS

3rd Generation Partnership Project, Technical Specification Group Radio Access Network, Radio Resource Control (RRC), Protocol specification (Release 10), 3GPP TS 25.331 V10.4.0, 2011-06.
3rd Generation Partnership Project, Technical Specification Group Core Network and Terminals, Mobile radio interface Layer 3 specification, Core network protocols, Stage 3 (Release 10), 3GPP TS 24.008 V10.3.0, 2011-06.

(Continued)

*Primary Examiner* — Olumide T Ajibade Akonai
(74) *Attorney, Agent, or Firm* — Coats & Bennett, P.L.L.C.

(57) ABSTRACT

The present invention relates to a method of a femtocell base station (1), for facilitating communication between a communication terminal (8) and a core network (4). The method comprises the femtocell base station (1) receiving a first message (11) from the communication terminal (8), the message (11) comprising a first message sequence number. The method also comprises the femtocell base station (1) producing a sequence number indicator arranged to indicate to the core network (4) to adjust (22) an expected message sequence number of the core network (4) to be synchronized with a corresponding message sequence number of the communication terminal (8). The method further comprises the femtocell base station (1) sending an update message (19*a*) to the core network (4), wherein the update message (19*a*) comprises the sequence number indicator. The invention also relates to a femtocell base station (1).

14 Claims, 3 Drawing Sheets

OTHER PUBLICATIONS

3rd Generation Partnership Project, Technical Specification Group Core Network and Terminals, Mobile radio interface signalling layer 3, General aspects (Release 10), 3GPP TS 24.007 V10.0.0, 2011-03.

3rd Generation Partnership Project, Technical Specification Group Radio Access Network, UTRAN architecture for 3G Home Node B (HNB), Stage 2 (Release 10), 3GPP TS 25.467 V10.2.0, 2011-06.

* cited by examiner

FEMTOCELL BASE STATION AND METHOD THEREOF

TECHNICAL FIELD

The invention relates to a femtocell base station, and a method of a femtocell base station, for facilitating communication between a communication terminal and a core network.

BACKGROUND

Femtocell base stations are known in different communication standards. The 3GPP standard with specification number 3GPP TS 25.467 v 10.2.0 for instance describes the UTRAN architecture for a femtocell base station for a 3G Home Node B (HNB).

Specifically, the 3GPP TS 25.467 standard specification describes a UE registration function as "The UE Registration Function for HNB provides means for the HNB to convey UE identification data to the HNB-GW in order to perform access control or membership verification for the UE in the HNB GW. The UE Registration also informs the HNB-GW of the specific HNB where the UE is located."

According to the standard, UE registration is performed by the HNB and the HNB registers a specific UE with the HNB-GW. The registration is triggered when the UE attempts to access the HNB via an initial NAS message over the Uu interface (e.g., Locating Updating (LU) Request or a CM Service Request initial NAS message) and there is no context in the HNB allocated for that UE.

Chapter 5.1.2 of the same standard describes the case where a HNB registers a UE in the HNB GW when either the UE or the HNB, or both, do not belong to a CSG. In this case, the standard describes the option that the HNB may in certain cases fetch the permanent identity of the subscriber with a NAS Identity Request procedure before registering the subscriber in the HNB GW. The step of fetching the permanent subscriber identity consists of a NAS Identity Request message sent by the HNB, and a NAS Identity Response message sent by the UE as a reply, containing the subscriber identity (IMSI).

A problem with the existing standard as described above is that the HNB uses a NAS message to fetch the identity of the subscriber. However, NAS messages are defined to be exchanged between the CN and the UE, and they are standardized in 3GPP TS 24.008. The NAS messages contain a 'sequence number', N(SD), that allows the CN to detect duplicated NAS messages sent by the UE. NAS messages may be duplicated by the Data Link layer in some cases, for example at channel change before the last layer 2 frame has been acknowledged by the peer. The NAS sequence number mechanism is described in 3GPP TS 24.007, chapter 11.2.3.2.3 and subchapters. The first NAS message is sent by the UE with sequence number '0'. The CN will receive this first NAS message with sequence number '0' in the RANAP Initial UE message. However, when the HNB fetches the subscriber identity with a NAS Identity Request message, then the UE will step the sequence number and reply with a NAS Identity Response with sequence number '1'. This means that the CN will discard any further NAS message sent by the UE to the CN, since the UE will send the next NAS message to the CN with the sequence number '2', but the CN expects the next NAS message to have the sequence number '1' according to TS 24.007. Thus, e.g. the Location Update Request or the CM Service Request in the CN will fail in certain cases, for example if the CN tries to authenticate the subscriber with a NAS Authentication Request, since the CN will discard the Authentication Response from the UE.

WO 2007/136339 discloses a method and radio network controller (RNC) in a radio access network (RAN) for controlling access to cellular telecommunication system. Upon receiving an access request from a given user equipment (UE) through a given radio base station (RBS), the RNC retrieves authorization information from an access control database within the RAN. The authorization information indicates whether the given UE is authorized to access the system through the given RBS. The RNC alternatively grants access or denies access to the UE based on the retrieved authorization information. The RBS is particularly useful for controlling access through small cells with limited capacity.

According to WO 2007/136339 the RAN is injecting NAS messages in the communication between the UE and the CN, whereby there is the possibility that the send sequence number, N(SD), may get out of synchronization between the UE and the CN. This may be a problem if the CN is performing any checks on the received N(SD). Thus, a procedure is performed to synchronize the N(SD). If the CN is performing checks on the N(SD), the Femto-RNC can be configured to perform N(SD)-mapping during the location updating procedure when the identification procedure was triggered from the Femto-RNC. The N(SD)-mapping procedure may include the steps:
a) The initial LOCATION UPDATING REQUEST message from the UE with N(SD)=0 is forwarded to the CN.
b) The N(SD) for all uplink NAS-messages is decreased by one, also taking into account the maximum value of N(SD) depending on the indicated core network release.

SUMMARY

It is an objective of the present invention to alleviate a problem with the prior art discussed above.

According to an aspect of the present invention, there is provided a method of a femtocell base station, for facilitating communication between a communication terminal and a core network. The method comprises the femtocell base station receiving a first message from the communication terminal, the message comprising a first message sequence number. The method also comprises the femtocell base station producing a sequence number indicator arranged to indicate to the core network to adjust an expected message sequence number of the core network to be synchronized with a corresponding message sequence number of the communication terminal. The method further comprises the femtocell base station sending an update message to the core network, wherein the update message comprises the sequence number indicator.

According to another aspect of the present invention, there is provided a method of a femtocell base station, for facilitating communication between a communication terminal, such as a mobile communication terminal, and a core network. The method comprises the femtocell base station sending a message to the core network. The message comprises a non-access stratum (NAS) sequence number increase indicator, NSNII, indicating to the core network to adjust a NAS message sequence number expected by the core network to be received in the next NAS message from the communication terminal, to be synchronized with a corresponding NAS message sequence number of the communication terminal.

According to another aspect of the present invention, there is provided a use of an update indicator for synchronizing an expected non-access stratum (NAS) message sequence number of a core network with a corresponding NAS message sequence number of a communication terminal associated with the core network.

According to another aspect of the present invention, there is provided a use of a communication message, for synchronizing a NAS message sequence number of a core network with a corresponding NAS message sequence number of a communication terminal, such as a mobile communication terminal e.g. a User Equipment, associated with the core network. The communication message may e.g. be a message between CN and RAN, such as a RANAP INITIAL UE MESSAGE message, comprising a non-access stratum (NAS) sequence number increase indicator, NSNII.

According to another aspect of the present invention, there is provided an update message, comprising a non-access stratum (NAS) sequence number indicator. The update message is adapted to indicate to a core network to adjust an expected NAS message sequence number of the core network to be synchronized with a corresponding NAS message sequence number of a communication terminal associated with the core network.

According to another aspect of the present invention, there is provided a communication message, such as a communication message between the RAN and the CN e.g. a RANAP INITIAL UE MESSAGE message, comprising a non-access stratum (NAS) sequence number increase indicator, NSNII. The message may be adapted to indicate to a core network to adjust a NAS message sequence number of the core network to be synchronized with a corresponding NAS message sequence number of a communication terminal, such as a User Equipment. The message may also be adapted to be sent by a femtocell base station, such as by a Home Node B or a Home Node B Gateway.

According to another aspect of the present invention, there is provided a femtocell base station. The femtocell base station is configured to send an update message to a core network, wherein the update message comprises a sequence number indicator, indicating to the core network to adjust an expected message sequence number of said core network to be synchronized with a corresponding message sequence number of a communication terminal associated with the core network.

According to another aspect of the present invention, there is provided a femtocell base station. The femtocell base station comprises a receiver configured with circuitry to receive NAS messages from a communication terminal, each of the NAS messages comprising a NAS message sequence number. The femtocell base station also comprises a sequence number update module which is configured with circuitry to produce a sequence number indicator if a received NAS message, having a first sequence number, will not be forwarded to a core network before a received NAS message, having a second sequence number which is consecutive to the first sequence number, will be forwarded to the core network. The femtocell base station further comprises a transmitter which is configured with circuitry to send an update message to the core network as well as to forward at least some of the received NAS messages to the core network, wherein the update message comprises the sequence number indicator.

According to another aspect of the present invention, there is provided a femtocell base station. The femtocell base station is adapted to send a message to a core network. The message comprises a non-access stratum (NAS) sequence number increase indicator, NSNII, indicating to the core network to adjust a NAS message sequence number of the core network, and for the communication terminal, to be synchronized with a corresponding NAS message sequence number of a communication terminal.

According to another aspect of the present invention, there is provided a communication system comprising a communication terminal, a core network, and a femtocell base station according to any one of the above aspects of the present invention.

According to another aspect of the present invention, there is provided a wireless communication system comprising a mobile communication terminal, a femtocell base station and a core network. The femtocell base station is adapted to send a message to the core network. The message comprises a non-access stratum (NAS) sequence number increase indicator, NSNII, indicating to the core network to adjust a NAS message sequence number expected by the core network to be received in the next NAS message from the communication terminal, to be synchronized with a corresponding NAS message sequence number of the communication terminal.

According to another aspect of the present invention, there is provided a Mobile Switching Center (MSC) configured to receive an update message from a femtocell base station, wherein the update message comprises a sequence number indicator, and to adjust an expected message sequence number of a core network comprising said MSC such that said expected message sequence number is synchronized with a corresponding message sequence number of a communication terminal associated with the core network.

According to another aspect of the present invention, there is provided a Mobile Switching Center (MSC) comprising a receiver configured with circuitry to receive an update message from a femtocell base station, wherein the update message comprises a sequence number indicator. The MSC also comprises a sequence number adjustment module configured with circuitry to adjust an expected message sequence number of a core network comprising said MSC such that said expected message sequence number is synchronized with a corresponding message sequence number of a communication terminal associated with the core network.

Discussions above and below relating to any one of the aspects of the invention are also, in applicable parts, relevant to any of the other aspects of the present invention.

As mentioned above, there is a potential problem with unsynchronized message sequence numbers, such as NAS message sequence numbers N(SD), between the communication terminal, such as a user equipment (UE), and a core network (CN) of a communication network when a femtocell is used between the communication terminal and the CN. By the femtocell base station producing a sequence number indicator which can indicate to the CN to adjust/update the sequence number expected by the CN such that said expected sequence number is synchronised with, i.e. is the same as, the corresponding sequence number of the communication terminal, this problem may be attended to and solved. The CN with adjusted expected sequence number will expect a sequence number of the next message from the communication terminal, such as a NAS message, which corresponds to (is the same as) the sequence number the communication terminal will give said next message to the CN. Thus, the signalling between the communication terminal and the CN will function regardless of any intermittent signalling between the femtocell and the communication terminal, e.g. NAS messages from the communication terminal not forwarded to the CN.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

Figure 1:
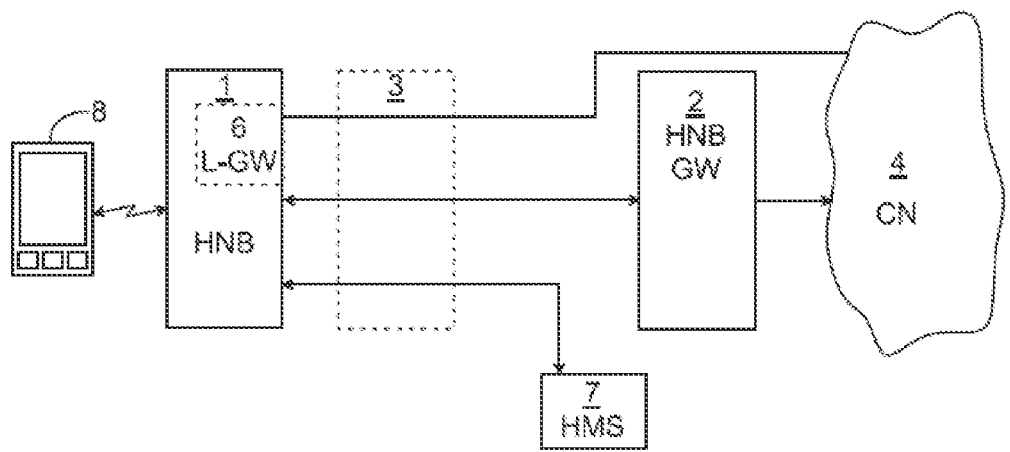
FIG. 1 is a schematic diagram illustrating a HNB access network reference model including the UE.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

| Abbreviations: | |
|---|---|
| UE: | User Equipment |
| HNB: | Home Node B |
| HNB-GW: | Home Node B Gateway |
| HMS: | HNB Management System |
| MSC: | Mobile Services Switching Centre |
| L-GW: | Local Gateway |
| SeGW: | Security Gateway |
| RAN: | Radio Access Network |
| RAT: | Radio Access Technology |
| CN: | Core Network |
| RNC: | Radio Network Controller |
| BSC: | Base Station Controller |
| BSS: | Base Station Subsystem |
| RNS: | Radio Network Subsystem |
| CSG: | Closed Subscriber Group |
| NAS: | Non-Access Stratum |
| IMSI: | International Mobile Subscriber Identity |
| RANAP: | Radio Access Network Application Part |
| RUA: | RANAP User Adaption |
| RRC: | Radio Resource Control |
| W-CDMA: | Wideband Code Division Multiple Access |
| LU: | Location Updating |
| 3GPP: | 3rd Generation Partnership Project |
| LTE: | Long Term Evolution |
| GSM: | Global System for Mobile Communications |
| UTRAN: | Universal Terrestrial Radio Access Network |

-continued

| Abbreviations: | |
|---|---|
| UTRA: | UMTS Terrestrial Radio Access |
| DSL: | Digital Subscriber Line |
| IE: | Information Element |
| NSNII | NAS sequence number increase indicator |

The mobile communication network described herein may comply with the UTRA standard of 3GPP and that is commonly referred to as W-CDMA or any other applicable standard such as LTE, GSM, etc. Hereinafter, references are on occasion made to messages according to W-CDMA for completeness sake, but it is to be noted that this does not restrict the embodiments, which can be applied to any suitable standard.

The discussion herein is mainly directed to UEs and HNBs of the 3GPP standard for W-CDMA. However, this should only be regarded as illustrating examples of the present invention. The present invention may also be relevant to other communication terminals and/or RAN nodes, such as femtocell base stations, past, present and future.

The discussion herein is mainly directed to wireless communication. However, the present invention may also be relevant to wired communication.

The term "femtocell base station" is to be interpreted as a base station device allowing access to a mobile communication network for mobile communication terminals within a small area, such as a home or small business. The femtocell base station is connected to the mobile communication network via an IP connection, such as over DSL (Digital Subscriber Line), a cable TV network or a Metropolitan Area Network.

The communication terminal may be any communication terminal able to be associated/communicate with a CN via a RAN node. The communication terminal may e.g. be a mobile phone or a portable computer.

That the message sequence numbers of the communication terminal and the CN, respectively, correspond to each other, implies that the message sequence number of the CN is in respect of/for that specific communication terminal and that they are for the same type of messages, e.g. NAS messages.

The method of the present invention may further comprise the femtocell base station sending a request message to the communication terminal and, in response to the request message, receiving a second message from said communication terminal, prior to sending the update message to the core network, the second message comprising a second message sequence number which is consecutive to the first message sequence number. By additional messaging between the femtocell base station and the communication terminal, the message sequence number may get out of sync with the expected message sequence number of the CN. This may be especially so if the femtocell base station sends a message, such as the request, on its own, i.e. not forwarding a message from the CN. If, for instance, the first message is of a type that is forwarded to the CN, then the CN may start its counter for the expected sequence number based on this first message. If the second message received by the femtocell base station is of a type intended for the femtocell base station and not forwarded to the CN, the CN will not increase its expected sequence number in view of said second received message, whereby it will be out of synch with the sequence number of the communication terminal for any further messages of the communication session from the communication terminal to the CN.

The sequence number indicator may be arranged to indicate to the core network to increment its expected message sequence number by a specified number of sequence steps. If the expected sequence number of the CN is out of synch with the corresponding sequence number of the communication terminal, this is likely by the sequence number of the communication terminal having been incremented further than the expected sequence number of the CN, due to message(s) sent to the femtocell base station and not forwarded to the CN. The sequence number indicator may thus conveniently induce the core network to increment its expected sequence number a number of steps, such as from 1 to 2 or 1 to 3, depending on the number of messages with sequence number sent from the communication terminal to the femtocell base station and not forwarded to the CN, such that the incremented expected sequence number is in sync with, i.e. the same as, the corresponding sequence number of the communication terminal.

The received first message may be a non-access stratum (NAS) message, and the expected message sequence number of the core network and the corresponding message sequence number of the communication terminal are NAS message sequence numbers. A specific situation where message sequence numbers may be used, and where thus problems with sequence numbers being out of sync between the communication terminal and the CN, may be NAS message signaling. The present invention may thus conveniently be implemented for NAS message signaling.

The update indicator (a.k.a. sequence number indicator) may comprise a NAS sequence number increase indicator (NSNII) if the sequence numbers to be synchronized are NAS message sequence numbers. The update indicator may in its turn be comprised in the update message. It may be convenient to include the update indicator, possibly including the NSNII, in an already existing message or information element of the communication standard, thus reducing the need to amend the standard. The update message may e.g. be a RANAP INITIAL UE MESSAGE message, comprising the update indicator possibly including the NSNII.

The present invention may resolve the problem of a sequence number mismatch (out of sync) directly in the Core Network, where the mismatch may first be detected. The advantage of this solution may be that no additional 'dummy' NAS messages need to be sent to the UE in order to resynchronize the sequence numbers. Another advantage may be that the present solution is not affected by any handover or relocation, where the UE would change to another RAN node, even if the new RAN node would be connected to another CN node, since the NAS signalling and sequence number check may be always done in the first CN node (e.g. anchor MSC) where the connection was established. In order to limit the changes of existing 3GPP standards and to avoid additional time consuming signaling between HNB, HNB-GW and CN, it may be beneficial to include the update indicator, e.g. the NSNII, in the RANAP Initial UE message, since that message is sent at registration anyway.

The standard specification with number 3GPP TS 25.467 v 10.2.0 describes the UTRAN architecture for a femtocell base station for 3G HNB. The overall architecture is shown in FIG. 1. A communication terminal 8 is in wireless communication with the HNB 1. The HNB 1 is in wired or wireless communication with the CN 4, via the HNB-GW 2 or an optional L-GW 6, and with the HMS 7 via the SeGW 3.

The HNB 1 is a piece of customer premise equipment that offers the Uu Interface to the UE 8 (e.g. a mobile communication terminal). Furthermore, the HNB 1 provides RAN connectivity using the Iuh interface, supports RNC like functions and supports HNB registration and UE registration over Iuh.

The SeGW 3 terminates secure tunneling for TR-069 (HNB Operation and Maintenance) as well as Iuh. Moreover, the SeGW 3 provides authentication of the HNB 1 and provides the HNB 1 with access to the HMS 7 and HNB-GW 2.

The HNB-GW 2 terminates the Iuh interface from the HNB 1 and appears as an RNC to the existing CN 4 using existing Iu interface. This means that the HNB Gateway 2 may be connected to for example an MSC, SGSN (Serving GPRS, General Packet Radio Service, Support Node) or GGSN (Gateway GPRS Support Node) in the CN 4. Moreover, the HNB-GW 2 supports HNB registration and UE registration functions over Iuh interface.

An optional L-GW 6 may be present only when the HNB 1 supports in Local IP (Internet Protocol) Access (LIPA) functionality. When present, it may be co-located with the HNB 1 in the 3GPP Rel-10 specification.

The HMS 7 can be based on TR-069 family of standards.

Figure 2:
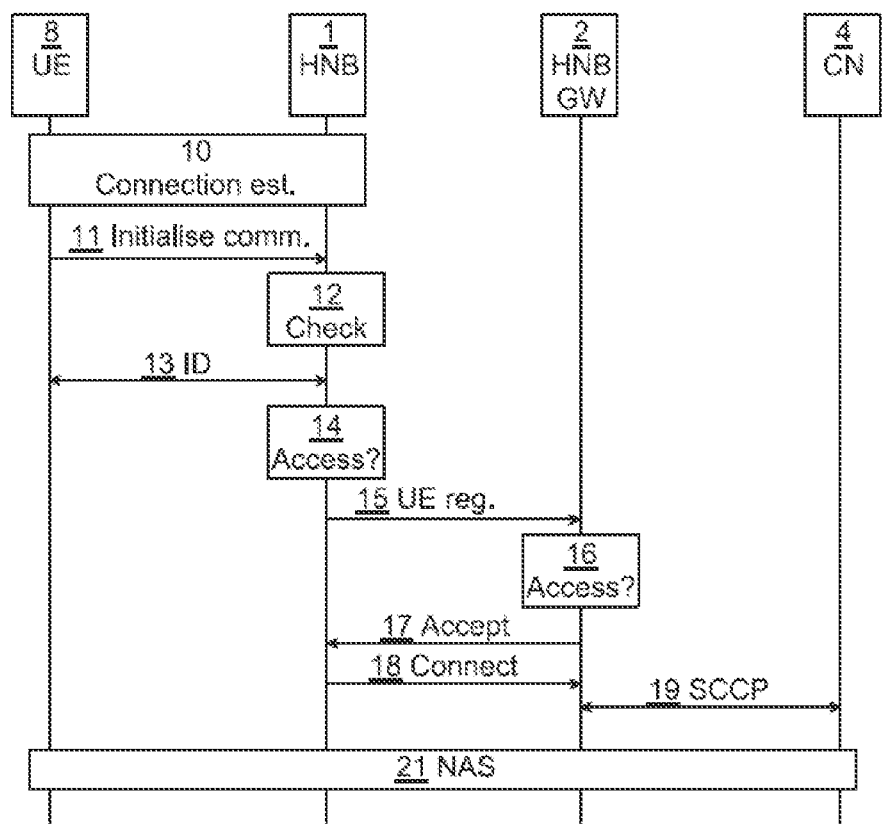
FIG. 2 is a sequence diagram illustrating UE Registration according to 3GPP TS 25.467.

FIG. 2 is a sequence diagram illustrating a UE Registration that may be performed in the system of FIG. 1. This is performed when the UE 8 registers with the HNB 1. Initially, the actual connection between the UE 8 and the HNB 1 is established 10.

The UE 8 then initializes communication 11, e.g. by sending a message in the form of an RRC Initial Direct Transfer message (e.g. a Location Update Request or CM Service Request, etc.)

The HNB 1 then checks 12 UE compatible standard release, UE capabilities etc.

Sometimes the identity of the subscriber using UE 8 is required in order to check access. This is provided 13 through a femtocell base station message from the HNB 1 to the UE 8 and a corresponding terminal message to the HNB 1, e.g. including an IMSI as an identifier. This is implemented using NAS messages, whereby the UE 8 increments a sequence number N(SD) and includes this sequence number in the terminal message.

The HNB 1 then optionally performs 14 an access control or membership verification using the IMSI as the identity of the UE 8.

If the access control is successful, the HNB 1 sends a UE registration message 15 to the HNB GW 2. The UE registration message 15 can for example include the subscriber identity, UE compatible standard release, UE capabilities, etc.

The HNB GW 2 then performs 16 another access control or membership verification.

If all the access controls are clear, the HNB GW 2 sends 17 a UE registration accept message, including context ID, etc. to the HNB 1.

The HNB 1 then sends 18 a RANAP User Adaption (RUA) connect message to the HNB GW 2, which sets up SCCP communication 19 with the CN 4. In the SCCP communication 19, the HNB GW 2 may send a SCCP CR message comprising the RANAP Initial UE message from step 11, containing the initial NAS message with N(SD)=0, and the CN 4 may respond with an SCCP CC message to the HNB GW 2. After that, further NAS communication 21 may occur between the CN 4 and the UE 8, via the HNB 1 and the HNB GW 2. As explained above, this procedure has issues, since a NAS sequence number was incremented by the UE 8 in the identity check 13 between the HNB 1 and the UE 8. This creates a discrepancy in sequence number between the UE 8 and the CN 4, which may result in messages being rejected by the CN 4, which may prevent subscriber registration with decreased performance as a result. However, a solution to this issue in accordance with an embodiment of the present invention is illustrated in the sequence diagram of FIG. 3.

FIG. 2 illustrates the UE registration for non-CSG UEs or non-CSG HNBs according to 3GPP TS 25.467.

The specification 3GPP TS 25.467 describes UE registration function as following (in section 5.1): "The UE Registration Function for HNB provides means for the HNB to convey UE identification data to the HNB-GW in order to perform access control or membership verification for the UE in the HNB GW. The UE Registration also informs the HNB-GW of the specific HNB where the UE is located."

UE registration may be performed by the HNB 1 and the HNB 1 registers a specific UE 8 with the HNB-GW 2. The registration is triggered when the UE 8 attempts to access the HNB 1 via an initial NAS message 11 over the Uu interface (e.g., LU Request) and there is no context in the HNB 1 allocated for that UE 8.

The chapter 5.1.2 of that standard describes the case that a HNB 1 registers a UE 8 in the HNB GW 2 when either UE 8 or HNB 1 or both do not belong to a CSG.

In that case the standard describes the option that the HNB 1 may in certain cases fetch the identity of the subscriber before registering the subscriber in the HNB GW 2 with a NAS Identity Request procedure 13. This step 13 of FIG. 2 consists of a NAS Identity Request message sent by the HNB 1, and a NAS Identity Response message sent by the UE 8 as a reply, containing the subscriber identity (IMSI).

A problem with the existing solution is that in step 13 of the registration procedure shown in FIG. 2, the HNB 1 uses a NAS message to fetch the identity of the subscriber. However, NAS messages are defined to be exchanged between the CN 4 and the UE 8, and they are standardized in 3GPP TS 24.008.

The NAS messages contain a 'sequence number', N(SD), that allows the Core Network 8 to detect duplicated NAS messages sent by the UE 8. NAS messages may be duplicated by the Data Link layer in some cases, for example at channel change before the last layer 2 frame has been acknowledged by the peer. The NAS sequence number mechanism is described in 3GPP TS 24.007, chapter 11.2.3.2.3 and subchapters: The first NAS message at or after RRC (Radio Resource Control) connection establishment is sent by the UE with sequence number '0' (e.g. in step 11 in FIG. 2, the Location Updating (LU) Request is sent with sequence number '0'). The CN 4 will receive this first NAS message with sequence number '0' in the RANAP Initial UE message (step 19 in FIG. 2).

However, when the HNB 1 fetches the subscriber identity with a NAS Identity Request message, then the UE 8 will step the sequence number and reply with a NAS Identity Response with sequence number '1'.

This means that the CN 4 will discard any further NAS message sent by the UE 8 to the CN 4, since the UE 8 will send the next NAS message to the CN 4 with the sequence number '2', but the CN 4 expects the next NAS message to have the sequence number '1' according to TS 24.007. This means that the Location Update Request or the CM Service Request in the CN 4 would fail in certain cases, for example if the CN 4 tries to authenticate the subscriber 8 with a NAS Authentication Request, since the CN 4 would discard the Authentication Response from the UE 8.

Note: In this specific case the sequence number is a 2-bit number as it is standardized in TS 24.007 for networks following 3GPP R99 or later. A Core network 4 with UTRAN access has to follow 3GPP R99 or later release.

The present invention proposes to circumvent or at least alleviate the problems described above by defining a new method to allow the RAN Node/femtocell base station 1 which creates the need for sequence number synchronization to indicate to the CN that an additional NAS message was triggered from RAN. Based on this indication the CN may accept NAS messages from the UE 8 with correct sequence number. The update indicator from the RAN/femtocell base station 1 to the CN 4 may conveniently be included as an information element in the RANAP INITIAL UE MESSAGE message.

The new information element included in the RANAP INITIAL UE MESSAGE message (see table 1 below) in accordance with an embodiment of the present invention is here called NAS Sequence Number Increase Indicator (NSNII). The NSNII may e.g. indicate any of the following information, depending on the number of NAS procedures triggered by the RAN:

"Single NAS procedure triggered from RAN" (such as the NAS Identity Request procedure). Handle the included NAS message as is and then increase the assumed next sequence number by one.

"X number of NAS procedures triggered from RAN" (such as the NAS Identity Request procedure). Handle the included NAS message as is and then increase the assumed next sequence number by X.

Table 1 below shows a new definition of the INITIAL UE MESSAGE in accordance with the above discussed embodiment of the present invention. This message is sent by the RNC to transfer the radio interface initial layer 3 message to the CN. Direction: RNC->CN. Signaling bearer mode: Connection oriented.

TABLE 1

| IE/Group Name | Presence | Range | IE Type and reference | Semantics description | Criticality | Assigned Criticality |
|---|---|---|---|---|---|---|
| Message Type | M | | 9.2.1.1 | | YES | Ignore |
| CN Domain Indicator | M | | 9.2.1.5 | | YES | Ignore |
| LAI | M | | 9.2.3.6 | | YES | Ignore |
| RAC | C – ifPS | | 9.2.3.7 | | YES | Ignore |
| SAI | M | | 9.2.3.9 | | YES | Ignore |
| NAS-PDU | M | | 9.2.3.5 | | YES | Ignore |
| Iu Signalling Connection Identifier | M | | 9.2.1.38 | | YES | Ignore |
| Global RNC-ID | M | | 9.2.1.39 | * | YES | Ignore |
| GERAN Classmark | O | | 9.2.1.57 | | YES | Ignore |
| Selected PLMN Identity | O | | 9.2.3.33 | | YES | Ignore |
| NAS Sequence Number | O | | 9.2.3.34 | | YES | Ignore |
| Permanent NAS UE Identity | O | | 9.2.3.1 | | YES | Ignore |
| Redirected Attempt Flag | O | | 9.2.3.50 | | YES | Ignore |
| Extended RNC-ID | O | | 9.2.1.39a | ** | YES | Reject |
| CSG Id | O | | 9.2.1.85 | | YES | Reject |
| Cell Access Mode | O | | 9.2.1.93 | | YES | Reject |

TABLE 1-continued

| IE/Group Name | Presence | Range | IE Type and reference | Semantics description | Criticality | Assigned Criticality |
|---|---|---|---|---|---|---|
| L-GW Transport Layer Address | O | | Transport Layer Address 9.2.2.1 | *** | YES | Reject |
| NSNII | O | | | | | |

*If the Extended RNC-ID IE is included in the message, the RNC-ID IE in the Global RNC-ID IE shall be ignored.
**The Extended RNC-ID IE shall be used if the RNC identity has a value larger than 4095.
***Indicating the Transport Layer address of the L-GW if the L-GW is co-located with the RNC.

Figure 3:
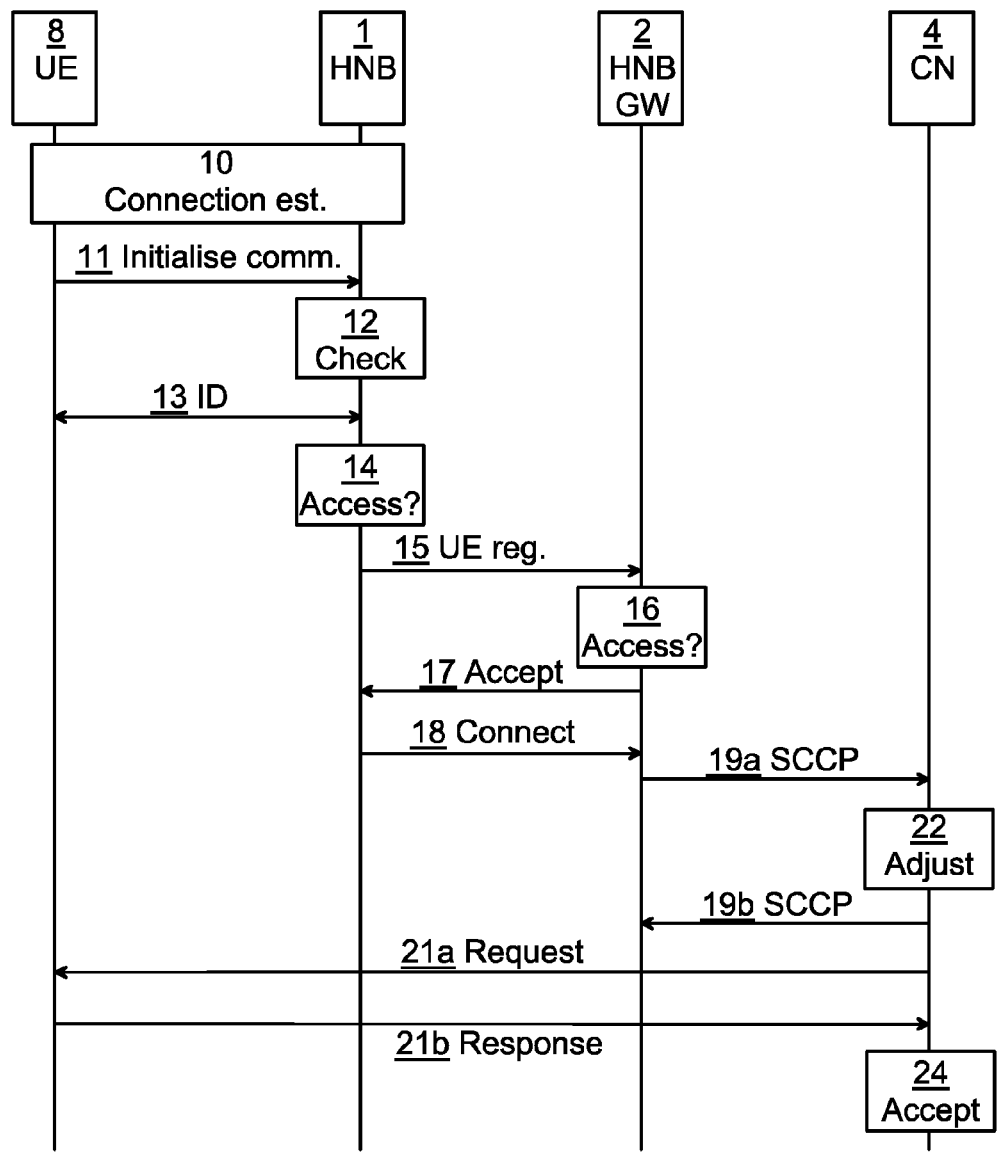
FIG. 3 is a sequence diagram illustrating an embodiment of a method for UE Registration in accordance with the present invention.

FIG. 3 is a sequence diagram which illustrates a solution, in accordance with an embodiment of the present invention, to the problem with non-corresponding sequence numbers in a communication between the UE 8 and the CN 4 via a femtocell base station. The initial steps 10-17 may be the same as discussed previously with reference to FIG. 2.

When the HNB 1 responds 18 with a connect message to the HNB GW 2, this connect message may in accordance with the embodiment of the present invention illustrated in FIG. 3 also include an update indicator such as the NSNII, e.g. RANAP Initial UE Message (LU Request with N(SD)=0, NSNII, . . . ). The SCCP CR message 19*a* from the HNB GW 2 to the CN 4 may then be e.g. SCCP CR (RANAP Initial UE Message (LU Request with N(SD)=0, NSNII, . . . )). The update indicator may e.g. instruct the CN 4 to handle the NAS message as usual and then adjust 22 the next expected N(SD)=2 instead of 1. The CN 4 may then respond to the HNB GW 2 with a conventional SCCP CC message as in FIG. 2. In the following NAS signaling 21, the CN 4 may e.g. send an Authentication Request 21*a* to the UE 8, the UE 8 responding with an Authentication Response 21*b* with N(SD)=2. This message is then accepted 24 by the CN 4 since the expected sequence number of the CN 4 has previously been adjusted to 2 based on the update indicator of the RANAP INITIAL UE MESSAGE included in the SCCP CR message 19*a*.

Figure 4:
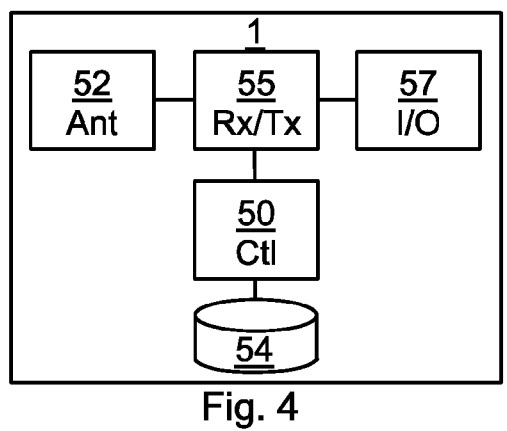
FIG. 4 is a schematic diagram of an HNB.

FIG. 4 is a schematic diagram showing some components of a HNB 1 such as any one of the HNBs discussed herein. A controller 50 is provided using any suitable central processing unit (CPU), microcontroller, digital signal processor (DSP), application specific integrated circuit etc., capable of executing software instructions stored in a computer program product 54, e.g. in the form of a memory. The computer program product 54 can be a memory or any combination of read and write memory (RAM) and read only memory (ROM). The memory also comprises persistent storage, which, for example, can be any single one or combination of magnetic memory, optical memory, solid state memory or even remotely mounted memory.

The HNB 1 also comprises an I/O interface 57 for communicating with the HNB GW using the security gateway over the Iuh interface, and optionally with other HNBs over the Iurh interface.

The I/O interface 57 implements a communication interface unit and is responsible for the implementation internet protocol (IP) interfaces. The controller, or control unit, 50 implements higher protocol layers and other control, such as Iuh, Iurh and Uu interfaces.

The HNB 1 also comprises one or more transceivers 55 and a corresponding number of antennas 52 for radio communication with mobile communication terminals over the Uu interface.

The HNB 1 may be a separate device or it can be combined with e.g. a DSL modem, Ethernet switch and/or WIFI access point.

Figure 5:
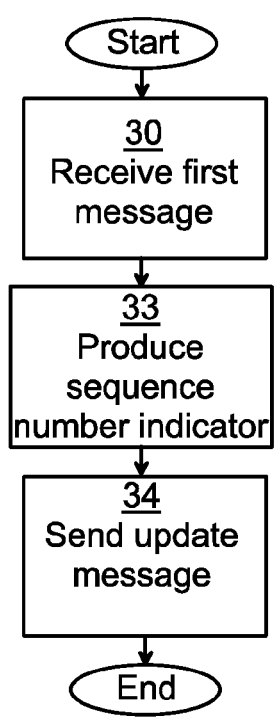
FIG. 5 is a schematic flow chart of an embodiment of a method of the present invention.

FIG. 5 is a schematic flow chart illustrating an embodiment of a method of the present invention. The method is performed in the HNB 1, or other serving RAN node such as a femtocell base station, for facilitating communication between the communication terminal 8 and the CN 4.

A first message from the communication terminal 8 is received 30 by the femtocell base station 1. Said first message comprises a first message sequence number. As discussed above, the first message may e.g. be a NAS message comprising an LU Request comprising the N(SD)=0.

The femtocell base station 1 may produce 33 the sequence number indicator as discussed above. The sequence number indicator is arranged to indicate to the CN 4 to adjust its expected message sequence number such that it is synchronized with, i.e. the same as, the corresponding message sequence number of the communication terminal 8, i.e. the sequence number of the next message with a sequence number from the communication terminal 8 to the CN 4.

An update message comprising the sequence number indicator is sent 34 to the CN 4 from the femtocell base station 1.

By this method, the CN 4 may thus be informed that, and how, it should update/adjust its expected message sequence number, NAS message sequence number, such that it corresponds to, is the same as, the message sequence number of the next future message, e.g. NAS message, sent from the communication terminal 8 to the CN 4. This future message may then be accepted by the CN 4, instead of being rejected due to not having the expected sequence number.

Figure 6:
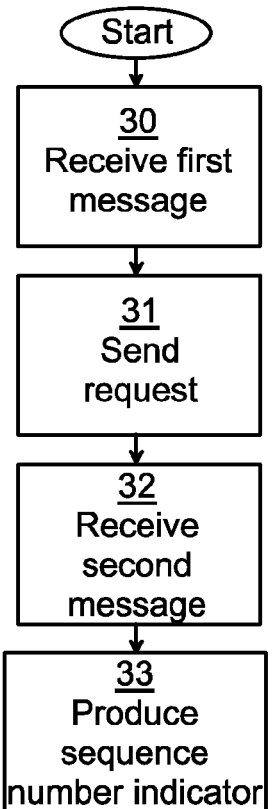
FIG. 6 is a schematic flow chart of another embodiment of a method of the present invention.

FIG. 6 is a schematic flow chart illustrating another embodiment of a method of the present invention. The embodiment may be a more specific version of the embodiment of FIG. 5.

A serving HNB 1 receives 30 a first NAS message from the UE 8. The NAS message comprises an LU Request with a NAS sequence number, e.g. N(SD)=0. The HNB 1 sends 31 an identity request to the UE 8, and in response receives 32 a second NAS message from the UE 8. The second NAS message has a NAS sequence number wish is consecutive to the sequence number of the first NAS message, in this example N(SD)=1.

The HNB 1 then proceeds with producing 33 the sequence number indicator, such as an NSNII, and sending 34 the update message to the CN 4 in the same way as described in FIG. 5 above.

While the embodiments described above relate to resynchronising sequence numbers of a core network due to communication between the HNB and the UE during registration, the same procedure is applicable to other occasions when the HNB would need to communicate with the UE without the knowledge of the CN, where the sequence number is incremented for messages from the UE.

Figure 7:
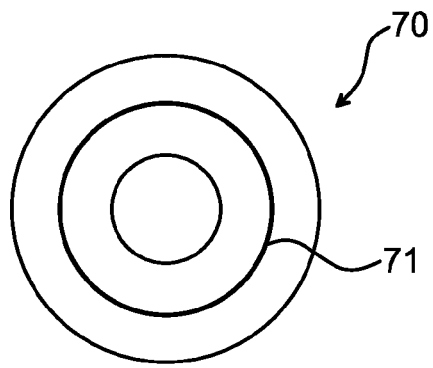
FIG. 7 illustrates an embodiment of a computer program product comprising computer readable means in accordance with the present invention.

FIG. 7 shows one example of a computer program product 70 comprising computer readable means. On this computer readable means a computer program 71 can be stored, which computer program 71 can cause a controller to execute a method according to embodiments of the present invention described herein. In this example, the computer program product is an optical disc, such as a CD (compact disc) or a DVD (digital versatile disc) or a Blu-Ray disc. The computer program product could additionally or alternatively be embodied as a memory of a device, such as memory 54 of the HNB 1. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for facilitating communication between a communication terminal and a core network, the method being performed by a femtocell base station, and comprising:
receiving a first message from the communication terminal, the message comprising a first message sequence number;
producing a sequence number indicator arranged to indicate to the core network to adjust an expected message sequence number of the core network to be synchronized with a corresponding message sequence number of the communication terminal; and
sending an update message to the core network, wherein the update message comprises the sequence number indicator.

2. The method of claim 1, further comprising the femtocell base station sending a request message to the communication terminal and, in response to the request message, receiving a second message from said communication terminal, prior to sending the update message to the core network, the second message comprising a second message sequence number which is consecutive to the first message sequence number.

3. The method of claim 1, wherein the sequence number indicator is arranged to indicate to the core network to increment its expected message sequence number by a specified number of sequence steps.

4. The method of claim 1, wherein the received first message is a non-access stratum (NAS) message, and the expected message sequence number of the core network and the corresponding message sequence number of the communication terminal are NAS message sequence numbers.

5. The method of claim 1, wherein the femtocell is part of a Wideband Code Division Multiple Access (W-CDMA) wireless communication network.

6. The method of claim 1, wherein the femtocell base station comprises a Home Node B (HNB).

7. A femtocell base station operative to facilitate communication between a communication terminal and a core network, comprising:
an transceiver configured to communicate with the core network, and also configured to communicate wirelessly with a communication terminal; and
a controller operatively associated with the transceiver, and configured to transmit to the core network, via the transceiver, an update message comprising an update indicator for synchronizing an expected non-access stratum (NAS), message sequence number of the core network with a corresponding NAS message sequence number of the communication terminal.

8. The femtocell base station of claim 7, wherein the update message includes a Radio Access Network Application Part (RANAP) INITIAL User Equipment (UE) MESSAGE.

9. The femtocell base station of claim 7, wherein the update indicator comprises a NAS sequence number increase indicator (NSNII).

10. A femtocell base station, the femtocell base station being configured to send an update message to a core network, wherein the update message comprises a sequence number indicator, indicating to the core network to adjust an expected message sequence number of said core network to be synchronized with a corresponding message sequence number of a communication terminal associated with the core network.

11. The femtocell base station of claim 10, wherein the femtocell base station comprises a Home Node B (HNB).

12. The femtocell base station of claim 10, comprising:
a transceiver configured to:
receive NAS messages from the communication terminal, each of the NAS messages comprising a NAS message sequence number; and
perform the sending of the update message as well as to forward at least some of the received NAS messages to the core network; and
a controller configured to produce the sequence number indicator if a received NAS message, having a first sequence number, will not be forwarded to the core network before a received NAS message, having a second sequence number which is consecutive to the first sequence number, will be forwarded to the core network.

13. The femtocell base station of claim 12, wherein the communication terminal is configured to operate as part of a communication system comprising the femtocell base station, the core network, and the communication terminal.

14. A Mobile Switching Center (MSC) configured to receive an update message from a femtocell base station, wherein the update message comprises a sequence number indicator, and to adjust an expected message sequence number of a core network comprising said MSC such that said expected message sequence number is synchronized with a corresponding message sequence number of a communication terminal associated with the core network.

* * * * *